(12) United States Patent
Chen et al.

(10) Patent No.: US 7,562,599 B2
(45) Date of Patent: Jul. 21, 2009

(54) BALL SCREW ASSEMBLY

(75) Inventors: Yan-Yu Chen, Taichung (TW); Xin-He Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 395 days.

(21) Appl. No.: 11/279,006

(22) Filed: Apr. 7, 2006

(65) Prior Publication Data

US 2007/0295131 A1    Dec. 27, 2007

(51) Int. Cl.
*F16H 25/22* (2006.01)
(52) U.S. Cl. ............... 74/424.86; 74/424.71; 74/424.81
(58) Field of Classification Search ................ 74/89.23, 74/424.81, 424.82, 424.86, 424.87, 424.71, 74/424.85
See application file for complete search history.

(56) References Cited

U.S. PATENT DOCUMENTS

| | | | | |
|---|---|---|---|---|
| 992,897 | A | * | 5/1911 | Nichols et al. ............ 74/424.87 |
| 3,393,575 | A | * | 7/1968 | Irwin ........................ 74/89.42 |
| 5,121,647 | A | * | 6/1992 | Teramachi .................. 74/89.3 |
| 5,228,353 | A | * | 7/1993 | Katahira et al. ............. 74/89.3 |
| 5,722,294 | A | * | 3/1998 | Kobayashi et al. ........... 74/89.4 |
| 6,053,064 | A | * | 4/2000 | Gowing et al. ............. 74/89.45 |
| 6,286,383 | B1 | * | 9/2001 | Shirai et al. .............. 74/424.88 |
| 6,880,424 | B2 | * | 4/2005 | McMillen ................... 74/500.5 |
| 6,968,752 | B2 | * | 11/2005 | Shimada .................... 74/89.23 |
| 2002/0023513 | A1 | * | 2/2002 | Sekiya et al. ............ 74/424.87 |
| 2008/0098840 | A1 | * | 5/2008 | Chen ....................... 74/424.87 |
| 2008/0110284 | A1 | * | 5/2008 | Pan et al. .................. 74/89.23 |
| 2008/0190231 | A1 | * | 8/2008 | Chiu et al. ............... 74/424.86 |

* cited by examiner

*Primary Examiner*—William C Joyce
*Assistant Examiner*—Matthew A Johnson
(74) *Attorney, Agent, or Firm*—Bang-ER Shia

(57) ABSTRACT

A ball screw assembly includes a helical groove formed in the outer surface of the screw shaft without extending to both ends thereof, and an escape portion formed in the form of a slot is connected to one end of the helical groove of the screw shaft. The escape portion allows the cassette to abut against an outer periphery of the screw shaft, and the tongue portion is inserted deeply in the escape portion, such that the cassette is allowed to be rotated to effect axial movement relative to the screw shaft, thus finishing assembly of the nut, and the balls can be prevented from dropping out of the ball screw when the nut is disengaged from the screw shaft or when the nut moves out of travel.

1 Claim, 6 Drawing Sheets

BALL SCREW ASSEMBLY

BACKGROUND OF THE INVENTION

1. Field of the Invention

The present invention relates to a ball screw assembly, and more particularly to a screw shaft, wherein a helical groove is formed in the outer surface of the screw shaft without extending to both ends thereof, and an escape portion in the form of a slot is connected to one end of the helical groove of the screw shaft, so that the tongue portion of the cassette can be rotated in the helical groove of the shaft along with the axial movement of the nut.

2. Description of the Prior Art

The rolling elements in a ball screw usually circulate in three ways: inner circulation, outer circulation, and end cap circulation. As shown in FIG. 1, which is a stereographic view of a conventional ball screw assembly whose balls 11 circulate through the axial hole of the nut 20, wherein a cassette 10 is fixed in a recess 201 formed in an end surface of the nut 20. The cassette 10 is defined with a return path 101 for the balls 11, and the cassette 10 is pushed in the axial direction of the nut 20 until the axial positioning portion 102 on the cassette 10 is positioned in the recess 201 of the nut 20, thus limiting the axial motion of the cassette 10. And then a screw 30 is screwed through the positioning hole 202 of the nut 20 into a locking hole 103 of the cassette 10, thus restricting the radial motion of the cassette 10. According to this assembly method, it must define a helical groove 402 in a shoulder portion 401 of the screw shaft 40 for facilitating the assembly of the nut 20. Hence, this assembly method is unsuitable for the helical groove defined directly in the screw shaft 40.

However, the helical groove 402 must extend to the end surface of the shoulder portion 401 for facilitating the assembly of the nut 20, and this will form a notch 404 in the abutting surface 403 of the shoulder portion 401. The notch 404 makes the screw shaft 40 impractical because of the following factors:

First, the helical groove 402 of the screw shaft 40 left a notch 404 in the abutting surface 403 of the shoulder portion 401, as a result, the integrality of the diameter of the abutting surface 403 is damaged (the outer periphery of the abutting surface 403 is not round). When both ends of the screw shaft 40 are mounted on bearing seats of a machine (not shown), and the motor of the machine starts to rotate the screw shaft 40, the rotation inertia will effect an axial load on both ends of the screw shaft 40. And due to the integrality of the diameter of the abutting surface 403 is damaged, the axial load cannot be evenly distributed on the both ends of the screw shaft 40. This will generate great pressure against the end surface (not shown) of the bearing seats, causing damage to the bearing seats, as a result of that, the screw shaft 40 will be deformed during rotation, adversely affecting the circulation of the rolling elements, but will reduce the service life of the screw shaft. Therefore, it is uneconomical.

Second, when both ends of the screw shaft 40 are mounted on bearing seats of a machine, the screw shaft 40 is then inserted through the nut 20 and filling balls, the ball screw is assembled by hand. The ball screw probably needs to be subjected to adjustment process (the respective components of the ball screw should be adjusted) during assembly, because of the adjustment process, the balls may drop out of the ball screw when the nut 20 is disengaged from the screw shaft 40 or when the nut 20 moves out of travel.

Hence, with the popularization of the linear transmission application, the demand of solving the aforementioned problems is becoming more and more urgent, and manufacturing an easily assembled and low cost ball screw assembly has become the most important selling point that the manufactures are striving for.

SUMMARY OF THE INVENTION

The primary objective of the present invention is to provide a ball screw assembly, wherein the assembly efficiency can be improved and the service life of the ball screw is prolonged.

To achieve the abovementioned objective, the helical groove is formed in the outer surface of the screw shaft without extending to both ends thereof, and an escape portion formed in the form of a slot is connected to one end of the helical groove of the screw shaft. The escape portion allows the cassette to abut against an outer periphery of the screw shaft, and the tongue portion is inserted deeply in the escape portion, such that the cassette is allowed to be rotated to effect axial movement relative to the screw shaft, thus finishing assembly of the nut.

Hence, the assembler only needs to manually insert the tongue portion of the cassette in the escape portion, and then rotate the tongue portion along the helical groove. After that, the balls are sequentially filled in the helical groove, and the helical groove is formed in the outer surface of the screw shaft without extending to both ends thereof. Such arrangements can prevent the balls from dropping out of the ball screw when the nut is disengaged from the screw shaft or when the nut moves out of travel.

Furthermore, since the helical groove is formed in the outer surface of the screw shaft without extending to both ends thereof, it can prevent generation of great pressure against the end surface (not shown) of the screw shaft and keep the screw shaft from deformation.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
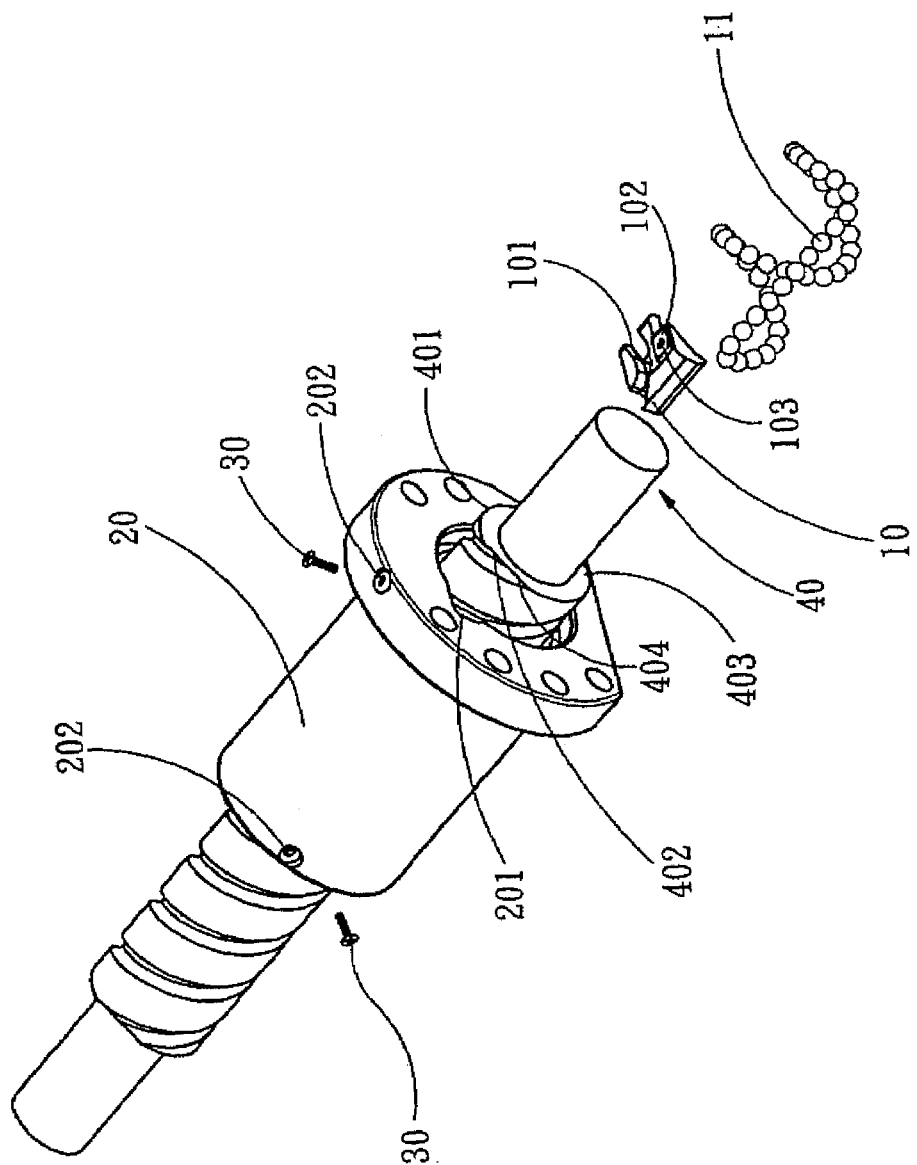
FIG. 1 is an exploded view of a conventional ball screw assembly.
Figure 2:
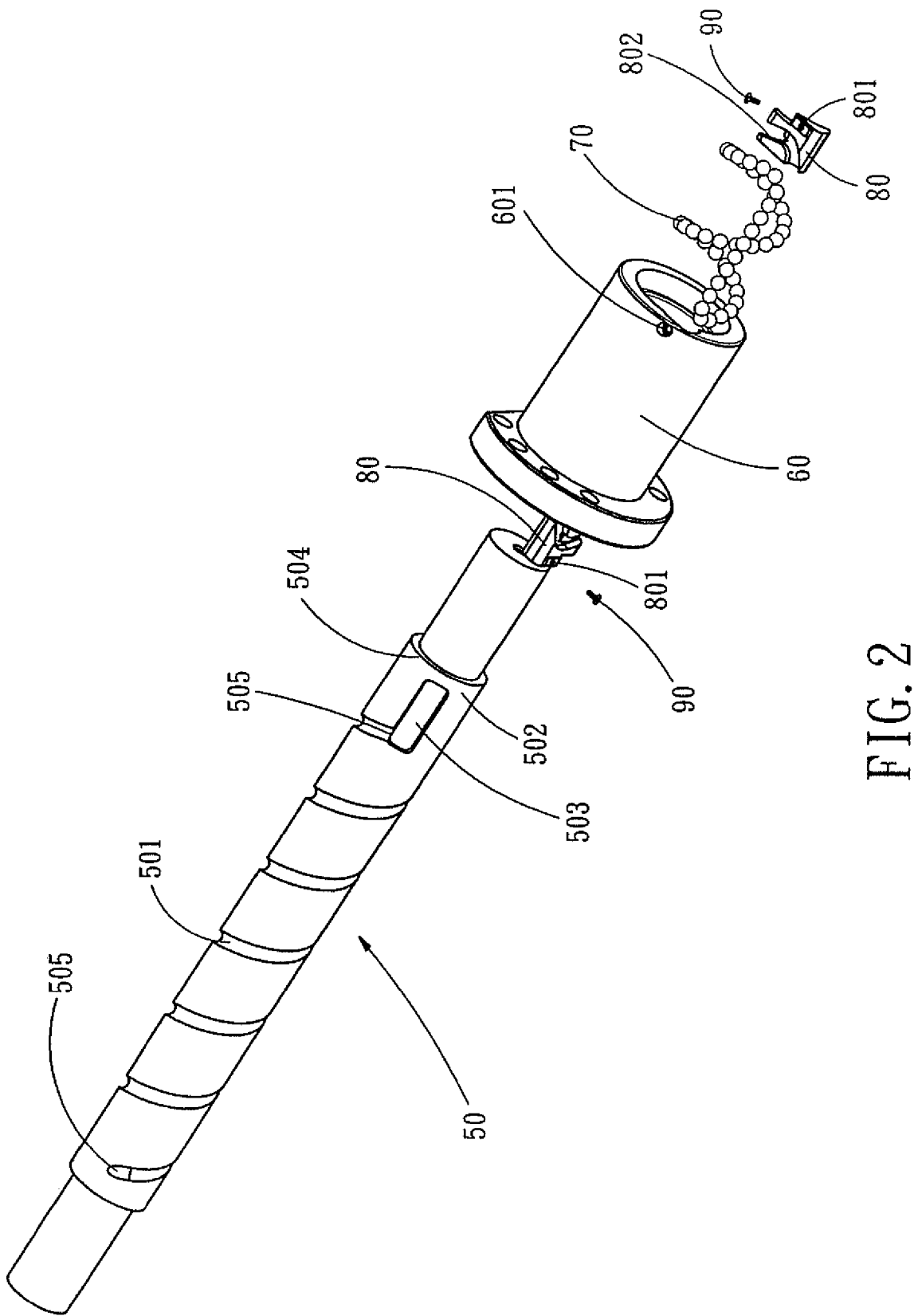
FIG. 2 is an exploded view of a ball screw assembly in accordance with the present invention.
Figure 3:
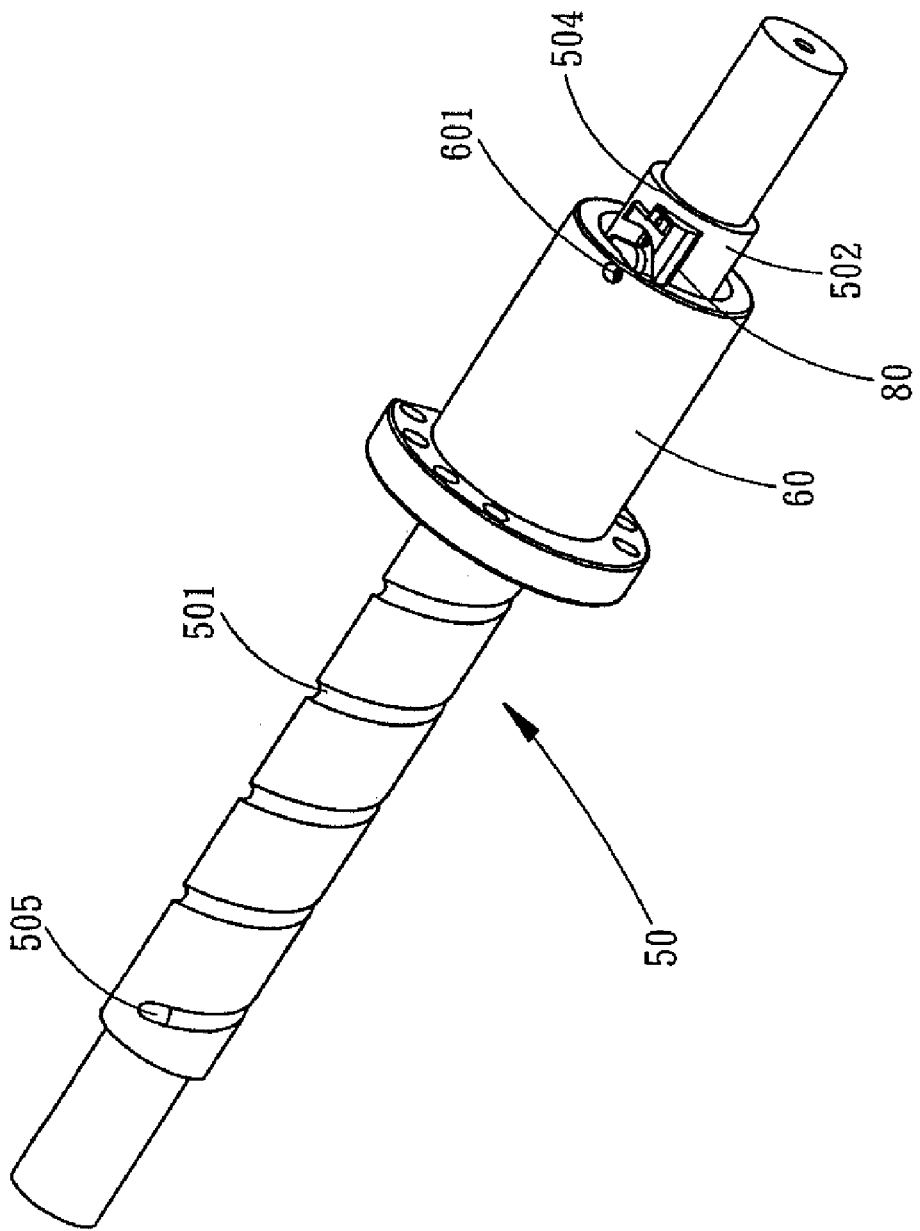
FIG. 3 is an assembly view of the ball screw assembly in accordance with the present invention.

The foregoing, and additional objects, features and advantages of the present invention will become apparent from the following detailed description of preferred embodiments thereof, taken in conjunction with the accompanying FIGS. 2 and 3.

A ball screw assembly in accordance with the present invention comprises a screw shaft 50, a nut 60, a plurality of balls 70 and a cassette 80. The nut 60 is mounted on the screw shaft 50. The cassette 80 is inserted in the nut 60 and then is fixed therein by screwing a screw 90 through a fixing hole 60 of the nut 60 and into the fixing hole 801 of the cassette 80, so that the nut 60 can be screwed onto the screw shaft 50. The balls 70 are sequentially filled in the helical groove 501, so that the cassette 80 can enable the balls 70 to circulate endlessly. This ball screw assembly is characterized in that:

A helical groove 505 is formed in the outer surface 504 of the screw shaft 50 without extending to both ends of the outer surface 504, and an escape portion 503 formed in the form of a slot is formed in the screw shaft 50 and has one end connected to one end 502 of the helical groove 505. It is to be noted that the other end of the escape portion 503 also doesn't extend to the shoulder portion 504 of the screw shaft 50.

The cassette 80 has a protruding tongue portion 802 whose length approximately equals to the width of the escape portion 503, and the tongue portion 802 is sized just large enough to be engaged in the escape portion 503 (the length of the tongue portion approximately equals to the width of the escape portion), so that the tongue portion of the cassette 80 can be screwed in the helical groove 505 along with the cassette 80 which is inserted in the nut 60.

The escape portion 503 allows the cassette 80 to abut against the outer periphery of the screw shaft 50, and the tongue portion 802 can be inserted deeply in the escape portion 503, such that the cassette 80 can be rotated to effect axial movement relative to the screw shaft 50, thus finishing assembly of the nut 60.

Figure 4:
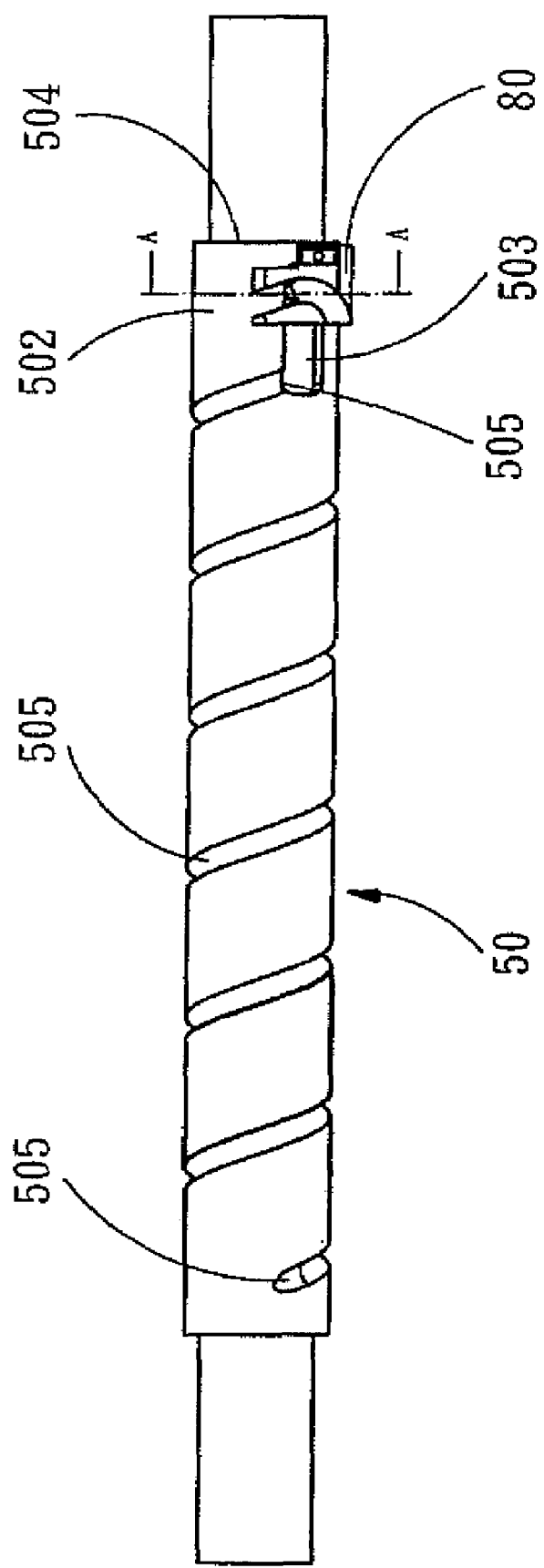
FIG. 4 is an illustrative view of showing the process of assembling the cassette to the screw shaft.
Figure 5:
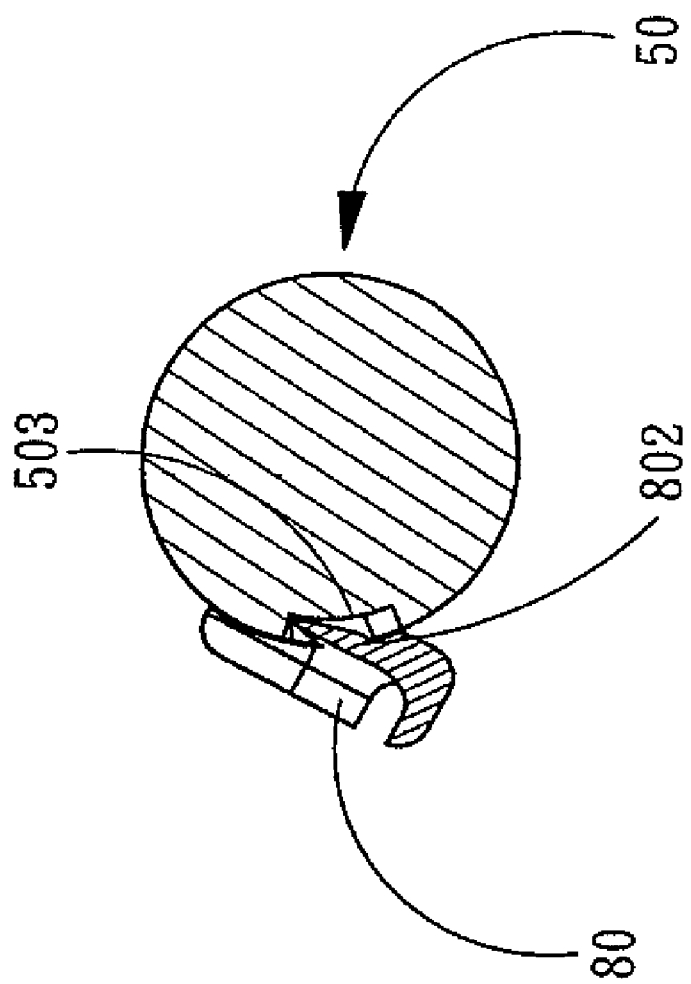
FIG. 5 is a cross sectional view of showing the process of assembling the cassette to the screw shaft.

It will be noted that (with reference to FIGS. 4 and 5) the helical groove 505 is formed in the outer surface 504 of the screw shaft 50 without extending to both ends thereof, the cassette 80 has a tongue portion 802 whose length approximately equals to the width of the escape portion 503, the tongue portion 802 is sized just large enough to be engaged in the escape portion 503, and the tongue portion 802 can be screwed in the helical groove 505, enabling the cassette 80 to abut against the outer periphery of the screw shaft 50 and to move axially along the screw shaft 50.

Hence, the assembler only needs to manually insert the tongue portion 802 of the cassette 80 in the escape portion 503, and then rotate the tongue portion 802 along the helical groove, thus effectively improving the assembly efficiency and reducing the assembly difficulty.

Figure 6:
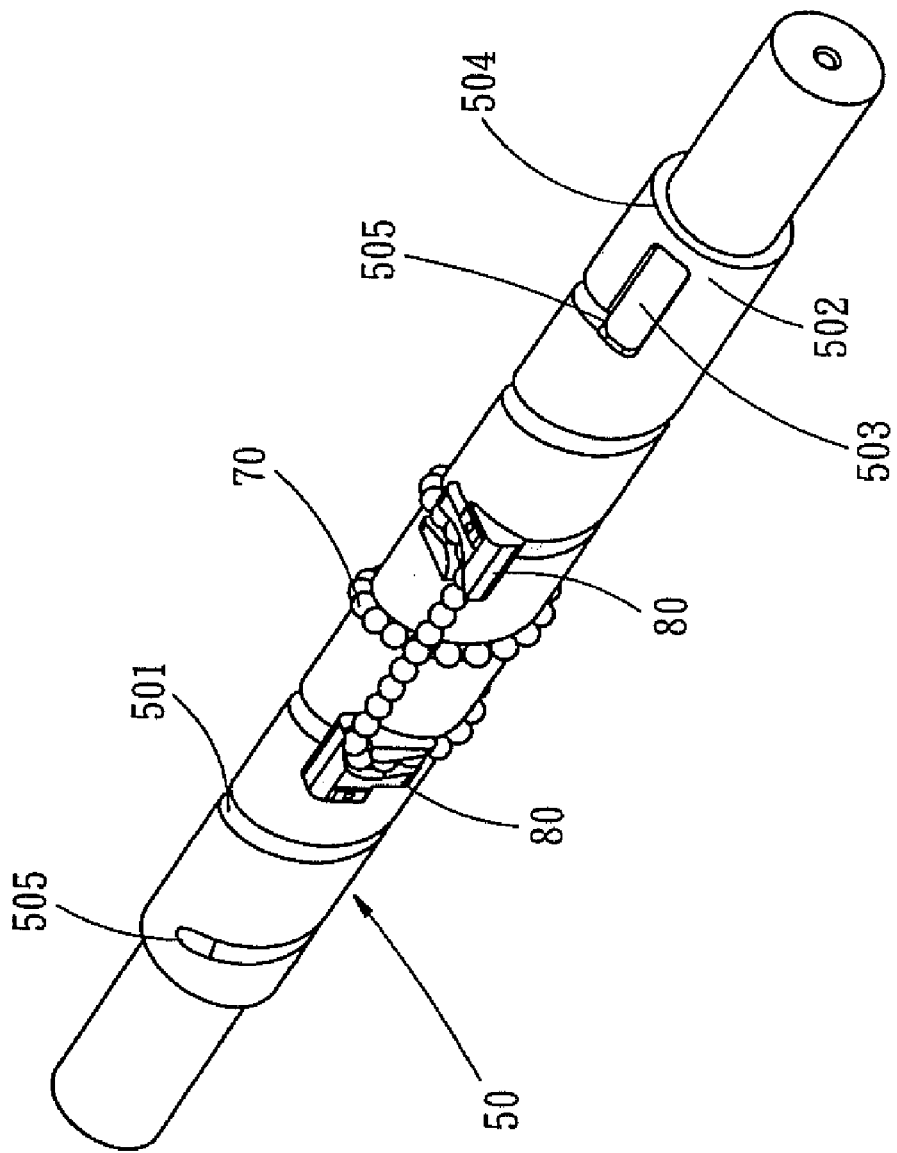
FIG. 6 is an illustrative view of showing the circulation of the balls within the ball screw assembly.

Finally, as shown in FIG. 6, the helical groove 505 is formed in the outer surface 504 of the screw shaft 50 without extending to the end surface of the shoulder portion 504, the escape portion 503 in the form of a slot is connected to one end 502 of the helical groove 505 of the screw shaft 50. Plus the cassette 80 has a tongue portion 802 that is to be rotated in the helical groove 505, enabling the cassette 80 to abut against the outer periphery of the screw shaft 50 and to move axially along the screw shaft 50. The balls 70 are sequentially filled in the helical groove 501, so that the balls 70 can circulate endlessly with the aid of the cassette 80. Such arrangements can prevent the balls 70 from dropping out of the ball screw when the nut is disengaged from the screw shaft or when the nut moves out of travel.

Furthermore, since the helical groove is formed in the outer surface of the screw shaft without extending to both ends thereof, it can prevent generation of great pressure against the end surface (not shown) of the screw shaft and keep the screw shaft from deformation.

While we have shown and described various embodiments in accordance with the present invention, it should be clear to those skilled in the art that further embodiments may be made without departing from the scope of the present invention.

What is claimed is:

1. A ball screw assembly comprising: a screw shaft, a nut, a plurality of balls and a plurality of cassettes, the nut is screwed on the screw shaft, the cassette is inserted in the nut and is fixed therein, the balls are sequentially filled in a helical groove of the screw shaft, so that the cassette can enable the balls to circulate endlessly, the ball screw assembly is characterized in that:

the helical groove is formed in an outer surface of the screw shaft without extending to an end surface of a shoulder portion of the screw shaft, and an escape portion is formed in the screw shaft in the form of a slot extending in an axial direction of the screw shaft, with one end of the escape portion connected to one end of the helical groove of the screw shaft, and the other end of the escape portion doesn't extend to the end of the shoulder portion of the screw shaft; and the cassette has a protruding tongue portion sized just large enough to be engaged in the escape portion, the tongue portion of the cassette is screwed in the helical groove along with the cassette which is inserted in the nut;

wherein a depth of the escape portion approximately equals a width of the helical groove, and a length of the tongue portion approximately equals a width of the escape portion.

* * * * *